US006295315B1

(12) United States Patent
Frisch et al.

(10) Patent No.: US 6,295,315 B1
(45) Date of Patent: Sep. 25, 2001

(54) JITTER MEASUREMENT SYSTEM AND METHOD

(76) Inventors: Arnold M. Frisch, 625 SW. 67th Pl., Portland, OR (US) 97225; Thomas H. Rinderknecht, 9251 SW. Cree Cir., Tualatin, OR (US) 97062

( * ) Notice: Subject to any disclaimer, the term of this patent is extended or adjusted under 35 U.S.C. 154(b) by 0 days.

(21) Appl. No.: 09/295,142

(22) Filed: Apr. 20, 1999

(51) Int. Cl.$^7$ .................................................. H04B 17/00
(52) U.S. Cl. ........................ 375/226; 375/375; 375/376; 327/160
(58) Field of Search ................................... 375/226, 371, 375/373, 374, 375, 376; 327/156, 159, 160

(56) References Cited

U.S. PATENT DOCUMENTS

| 3,325,750 | * | 6/1967 | O'Hern et al. . | |
|---|---|---|---|---|
| 4,164,648 | | 8/1979 | Chu | 235/92 |
| 4,444,051 | * | 4/1984 | Yamaki et al. | 73/304 C |
| 4,678,345 | * | 7/1987 | Agoston | 368/119 |
| 4,774,681 | | 9/1988 | Frisch | 364/554 |
| 5,179,368 | * | 1/1993 | Lippincott | 340/707 |
| 5,220,581 | * | 6/1993 | Ferraiolo et al. | 375/224 |
| 5,883,924 | * | 3/1999 | Siu et al. | 375/226 |
| 5,963,502 | * | 10/1999 | Watanabe et al. | 365/233 |
| 6,137,283 | * | 10/2000 | Williams et al. | 324/76.12 |

OTHER PUBLICATIONS

B.R. Veillette and G.W. Roberts, On–Chip Measurement of the Jitter Transfer Function of Charge–Pump Phase–Locked Loops, IEEE Journal of Solid–State Circuits, vol. 33, No. 3, pp. 483–491, Mar. 1998.

Internet document: http://www.logicvision.com/solution/pllbist.htm—undated.

* cited by examiner

*Primary Examiner*—Don N. Vo
(74) *Attorney, Agent, or Firm*—Ipsolon LLP

(57) ABSTRACT

A jitter measurement system measures timing variations or "jitter" in a periodic signal waveform as provided, for example, by a phase-locked loop (PLL). In one implementation, the jitter measurement system includes a period gate generator that generates a gate signal with the instantaneous period of output signal waveform $F_{VCO}$ generated by the PLL. The gate signal includes a leading edge and a trailing edge and is delivered to a pair of triggered oscillators that provide respective oscillator output signals with substantially matched frequencies. The oscillators are triggered at the respective leading and trailing edges of the gate signal. The oscillator output signals are delivered to respective oscillation counters and to a coincidence detector. The oscillation counters count the periods of the respective oscillator output signals from when they are triggered until the coincidence detector detects coincidence between the signals (e.g., coincidence between the trailing edges of the signals). A period measurement of the output signal waveform $F_{VCO}$ is determined from the counts obtained by the oscillation counters. Multiple such period measurements are obtained to provide information representing jitter in the output signal waveform $F_{VCO}$.

32 Claims, 3 Drawing Sheets

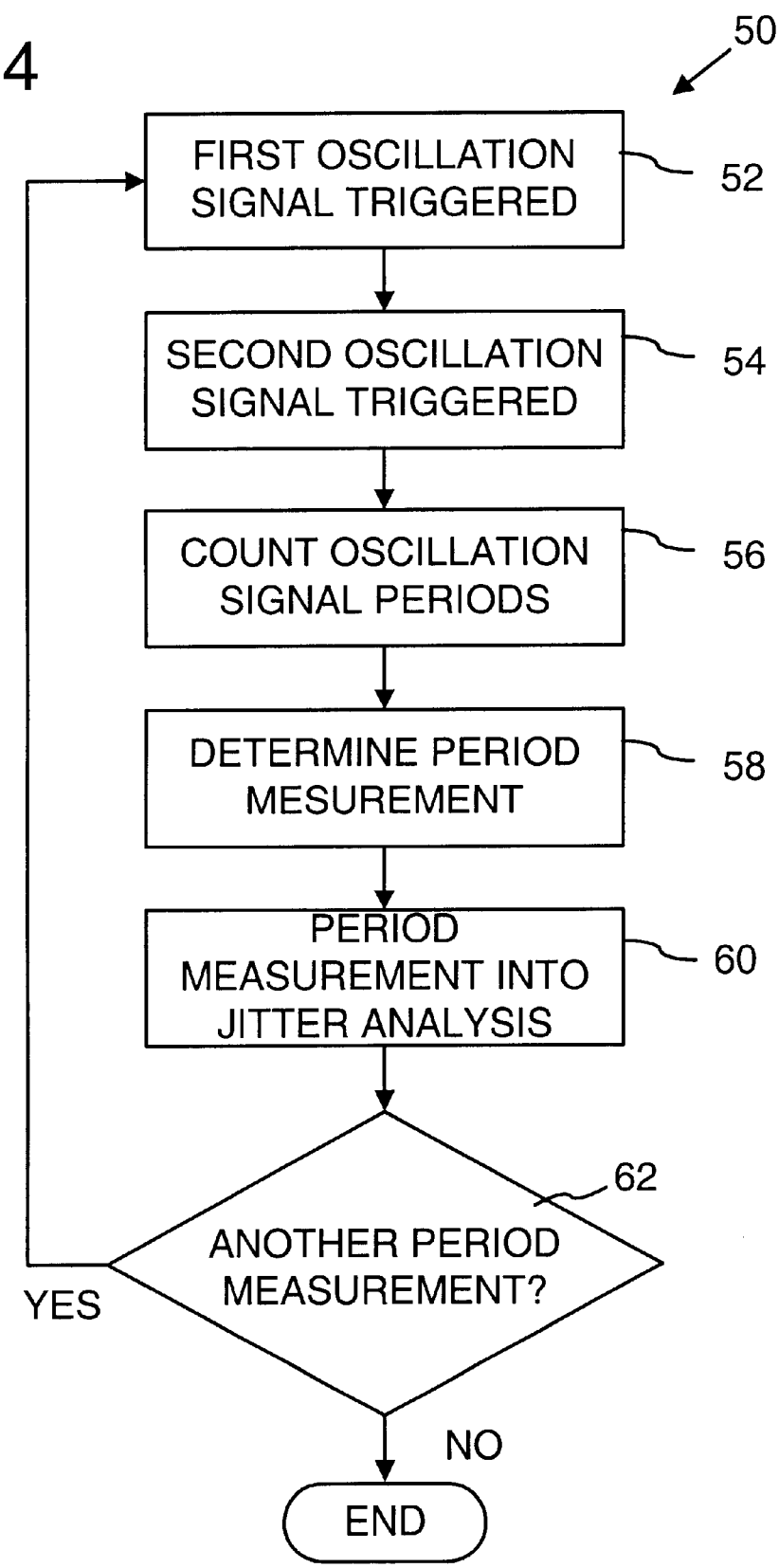

JITTER MEASUREMENT SYSTEM AND METHOD

FIELD OF THE INVENTION

The present invention relates to a system and method for measuring time jitter in periodic signals and, in particular, to such a system and method that are suited to built-in self test applications for phase-locked loops.

BACKGROUND AND SUMMARY OF THE INVENTION

Phase-locked loops (PLLs) are used in a wide variety of applications including frequency synthesis, timing recovery, clock distribution, and phase demodulation. These applications are sometimes employed, for example, in optical fiber links, wireless telephones, and computers. In many of these applications, timing variations or jitter characteristics of a PLL can significantly affect the performance of the PLL and the application in which the PLL is used.

With reference to timing or clock recovery, for example, a PLL may be used to recover a clock signal from a serial data stream. As the signal-to-noise ratio of a data stream decreases, the recovered clock signal can have timing variations or "jitter." A jittery clock signal can introduce errors in the reading of the serial data stream, thereby increasing the bit error rate for the data stream. As a result, measuring the performance of a PLL in terms of its jitter can be important to providing accurate clock recovery and lower bit error rates.

As another example, some large integrated circuits include PLLs for clock generation. The PLL may provide a clock signal that is phase-shifted relative to a supply clock signal. Accurate operation of such an integrated circuit can require that the PLL provide the phase-shifted clock signal without jitter.

Accurate measurement of jitter characteristics, including jitter characteristics of PLLs, is needed for a wide variety of applications. Moreover, with PLLs increasingly being incorporated into larger-scale integrated circuits, jitter measurement components suitable for built-in self test applications are also desirable. While some jitter measurement components suitable for built-in self test applications are available, their design limits their resolution to the period of about one gate delay of the process used to build the circuit (e.g., 100–200 picoseconds for CMOS-based circuits). With signals having frequencies on the order of 100 MHz, such a jitter measurement resolution is no better than 1 percent of the signal period. Such a resolution can be inadequate.

The present invention provides, therefore, a jitter measurement system for measuring timing variations or "jitter" in a periodic signal waveform as provided, for example, by a PLL. In one implementation a PLL receives a periodic input signal waveform $F_{REF}$ and generates a periodic output signal waveform $F_{VCO}$ with a frequency and phase that correspond to the input signal $F_{REF}$. The jitter measurement system measures jitter in the output signal waveform $F_{VCO}$.

In one implementation, the jitter measurement system includes a period gate generator that generates a gate signal with the instantaneous period of the output signal waveform $F_{VCO}$. The gate signal includes a leading edge and a trailing edge and is delivered to a pair of triggered oscillators that provide respective oscillator output signals with substantially matched frequencies. The oscillators are triggered at the respective leading and trailing edges of the gate signal. The oscillator output signals are delivered to respective oscillation counters and to a coincidence detector. The oscillation counters count the periods of the respective oscillator output signals from when they are triggered until the coincidence detector detects coincidence between the signals (e.g., coincidence between the trailing edges of the signals). A period measurement of the output signal waveform $F_{VCO}$ is determined from the counts obtained by the oscillation counters. Multiple such period measurements are obtained to provide information representing jitter in the output signal waveform $F_{VCO}$.

With measurements based upon coincidence between them, the oscillator output signals function together as a vernier scale that provides high resolution period measurements. The extent to which the frequencies of the oscillator output signals are matched determines the resolution with which the jitter measurement system can measure the period of the output signal waveform $F_{VCO}$ and hence its jitter. The frequencies are substantially matched in that they differ by less than 1 percent and, in some implementations, by 1/10 percent or less. For example, oscillator output signals having frequencies that are about 100 MHz to within 1/10 percent are capable of period measurements to a resolution of about 10 picoseconds. Such a resolution is an order of magnitude better than that of available jitter measurement systems that are suitable for built-in self test (BIST) and automatic test equipment (ATE) applications.

Additional objects and advantages of the present invention will be apparent from the detailed description of the preferred embodiment thereof, which proceeds with reference to the accompanying drawings.

BRIEF DESCRIPTION OF THE DRAWINGS

FIG. 4 is a flow diagram of a jitter measurement process for measuring timing variations or "jitter" in a periodic signal waveform.

DETAILED DESCRIPTION OF PREFERRED EMBODIMENTS

Figure 1:
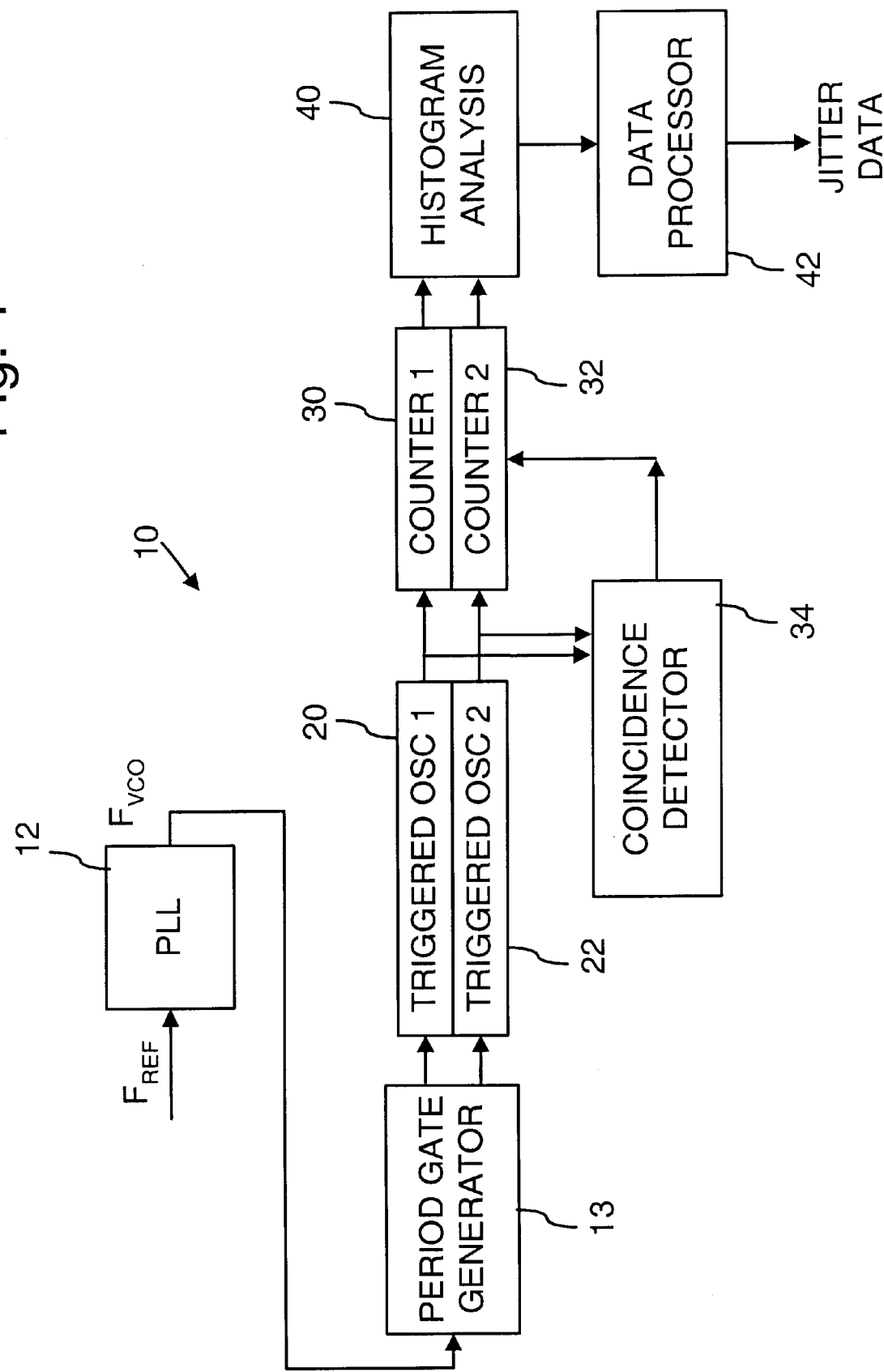
FIG. 1 a block diagram of a jitter measurement system for measuring timing variations or "jitter" in a periodic signal waveform.

FIG. 1 is a block diagram of a jitter measurement system 10 for measuring timing variations or "jitter" in a periodic signal waveform. Jitter measurement system 10 is described herein with reference to measuring jitter in a signal waveform provided by a phase-locked loop (PLL) 12. As is known in the art, phase-locked loops are used in a wide variety of applications such as frequency synthesis, timing recovery, clock distribution, and phase demodulation. These applications are sometimes employed, for example, in optical fiber links, wireless telephones, and computers. It will be appreciated, however, that jitter measurement system 10 may similarly measure jitter in periodic signal waveforms provided by other sources.

In accordance with its conventional operation, PLL 12 receives a periodic input signal waveform $F_{REF}$ and generates a periodic output signal waveform $F_{VCO}$ with a frequency and phase that correspond to the input signal $F_{REF}$. Jitter measurement system 10 measures jitter in the output signal waveform $F_{VCO}$.

Figure 2:
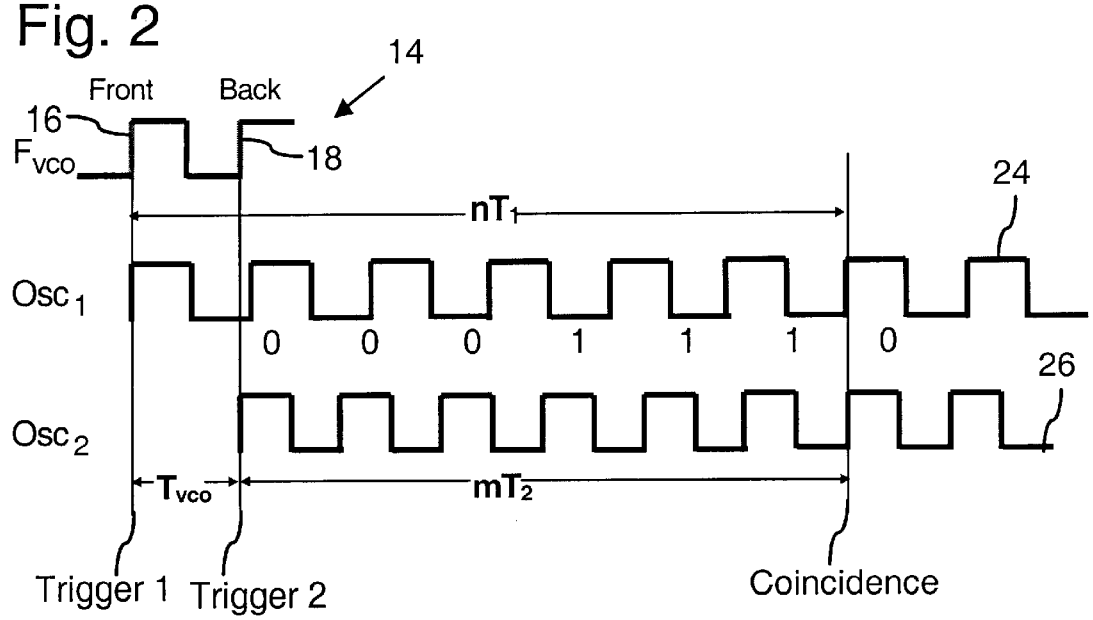
FIG. 2 is a signal timing diagram illustrating an exemplary implementation of oscillator output signals and in relation to gate signal.

Referring also to FIG. 2, jitter measurement system 10 includes a period gate generator 13 that generates a gate signal 14 that is labeled as and has the instantaneous period of the output signal waveform $F_{VCO}$. Gate signal 14 includes a leading edge 16 and a trailing edge 18 and is delivered to a pair of triggered oscillators 20 and 22 that provide respective oscillator output signals 24 and 26 with substantially matched frequencies. Oscillators 20 and 22 are triggered at, respectively, leading edge 16 and trailing edge 18 of gate signal 14.

Oscillator output signals 20 and 22 are delivered to respective oscillation counters 30 and 32 and to a coincidence detector 34. Oscillation counters 30 and 32 count the periods of the respective oscillator output signals 20 and 22 from when they are triggered until coincidence detector 34 detects coincidence between the signals (e.g., coincidence between the trailing edges of the signals).

The extent to which the frequencies of oscillator output signals 20 and 22 are matched determines the resolution with which jitter measurement system 10 can measure the period of the output signal waveform $F_{VCO}$ and hence its jitter. The frequencies are substantially matched in that they typically differ by less than 1 percent and, in some implementations, by 1/10 percent or less. For example, oscillator output signals having frequencies that are about 100 MHz to within 1/10 percent are capable of period measurements to a resolution of about 10 picoseconds.

In one implementation, coincidence detector 34 may include a shift register that receives one of oscillator output signals 24 and 26 as a clock signal input (e.g., oscillator output signal 26) and receives the other of oscillator output signals 24 and 26 as a data input signal (e.g., oscillator output signal 24). In the illustration of FIG. 2, the shift register would initially obtain the low (or zero) value of oscillator output signal 24 that is present as of the triggered leading edge of oscillator output signal 24. This low (or zero) value may be considered a coincidence data value and is indicated in FIG. 2 beneath oscillator output signal 24. The next two coincidence data values of oscillator output signal 24 would be low (or zero), and the subsequent three coincidence data values of oscillator output signal 24 would be high (or one). Coincidence between oscillator output signals 24 and 26 would be detected upon the high-to-low (one-to-zero) transition of the coincidence data value of oscillator output signal 24.

It will be appreciated that this illustration is merely exemplary. For example, with the period of oscillator output signal 24 less than the period of gate signal 14, the initial data values of oscillator output signal 24 obtained by the shift register would be high (one). Coincidence between oscillator output signals 24 and 26 would in this case be detected upon a low-to-high (zero-to-one) transition of the data value of oscillator output signal 24.

Coincidence detector 34 delivers count termination signals to control inputs 36 and 38 of respective counters 30 and 32 when coincidence between output signals 24 and 26 is detected. As a result, oscillation counters 30 and 32 count the numbers of cycles of oscillator output signals 24 and 26 from when they are triggered from gate signal 14 until receiving the count termination signals.

Figure 3:
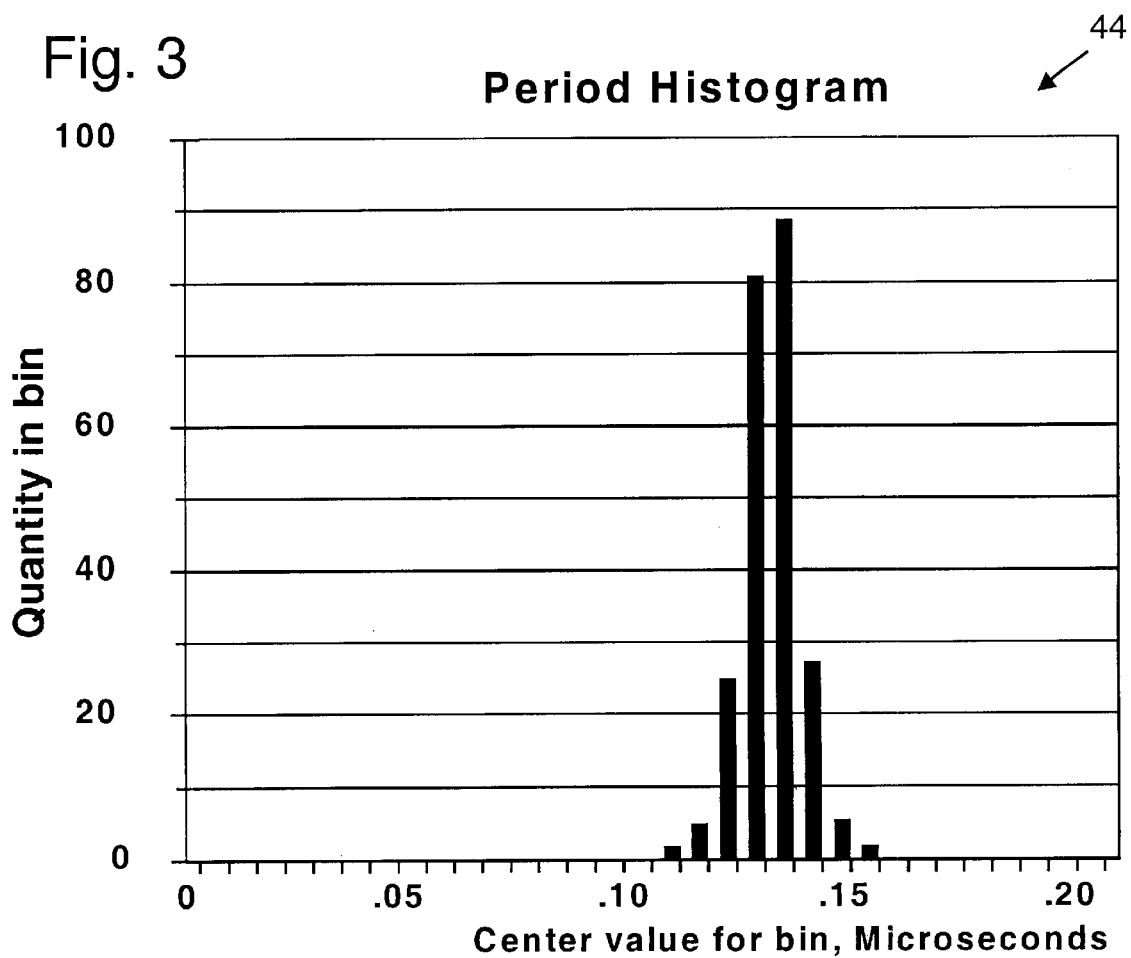
FIG. 3 a graph of an exemplary histogram graph for multiple exemplary measured periods of a periodic signal waveform.

Jitter measurement system 10 employs repeated measurements of the period $T_{VCO}$ of the gate signal 14 to measure the jitter in the signal. Accordingly, each measured period $T_{VCO}$ is delivered to a histogram analysis component 40, which constructs a histogram of the measured periods $T_{VCO}$. A histogram in this regard refers to a form of data tracking or analysis in which the numbers of occurrences of data values that fall within preselected ranges (or "bins") are determined or counted. Such numbers may be represented, for example, by a histogram graph. FIG. 3 is a graph 44 of an exemplary histogram for a exemplary measured periods $T_{VCO}$. Histogram analysis component 40 may be implemented with a programmed processor or with a dedicated circuit as described, for example, in U.S. Pat. No. 4,774,681. It is a relatively straightforward matter to process the resulting histogram to extract the peak to peak and rms values of the time jitter associated with $T_{VCO}$.

In general, the counts provided by counters 30 and 32 may be used by a programmed or fixed circuit processor 42 to determine the period $T_{VCO}$ of the gate signal 14 by the following equation:

$$T_{VCO}=nT_1-mT_2$$

in which n and m are the numbers of oscillations, cycles, or periods determined by counters 30 and 32 and $T_1$ and $T_2$ are the periods of oscillator output signals 24 and 26, respectively. In the illustrated special case in which the period of oscillator output signal 24 is greater than the period of gate signal 14 (and hence underlying output signal waveform $F_{VCO}$), the counts n and m will be equal, which simplifies the measurement determination to:

$$T_{VCO}=n(T_1-T_2).$$

With measurements based upon coincidence between them, oscillator output signals 20 and 22 function together as a vernier scale that provides high resolution period measurements. FIG. 4 is a flow diagram of a jitter measurement process 50 for measuring timing variations or "jitter" in a periodic signal waveform provided, for example, by a PLL.

Process block 52 indicates that a first oscillation signal is triggered with reference to a leading edge of a selected period of the periodic signal waveform. The first oscillation signal may be triggered directly or indirectly from the selected period. Indirect triggering could employ a gate signal with an instantaneous period matching the selected period, as described above with reference to jitter measurement system 10.

Process block 54 indicates that a second oscillation signal is triggered with reference to a trailing edge of the selected period. The second oscillation signal may be triggered directly or indirectly from the selected period.

Process block 56 indicates that the number of periods of the first and second oscillation signals are counted until the two signals coincide with each other.

Process block 58 indicates that a period measurement is determined for the selected period from the numbers of periods of the first and second oscillation signals that are counted until the two signals coincide with each other.

Process block 60 indicates that the period measurement for the selected period is incorporated into a jitter measurement analysis. The jitter measurement analysis includes multiple period measurements of the periodic signal waveform.

Query block 62 represents an inquiry as to whether another period measurement is to be taken. Query block 60 returns to process block 52 whenever another period measurement is to be taken and otherwise proceeds to termination block 64.

Jitter measurement system 10 and jitter measurement process 50 are described as being generally applicable to measuring jitter in periodic signals. In some implementations, however, jitter measurement system 10 and jitter measurement process 50 may be employed in connection with built-in self test (BIST) components of larger integrated circuits such as application specific integrated circuits (ASICs), field programmable gate arrays (FPGAs), as well as integrated circuits that include or employ phase-locked loops. Accordingly, one or more components of jitter measurement system 10 may be incorporated into such integrated circuits in as a BIST system.

In one implementation, all components other than data processor 42 are incorporated into an integrated circuit in as a BIST system. In this implementation, it is advantageous to construct the histogram on the device tested in order to compress the measurement data and reduce data transfer and measurement times. Moreover, incorporating jitter measurement system 10 or process 50 as a BIST component in an integrated circuit can provide enhanced accuracy in the measurement of jitter.

The resolution and accuracy of jitter measurement system 10 improves with the degree to which the frequencies of oscillators 20 and 22 are matched. As described above, calculations of period measurements are based in part upon the difference in the periods of the oscillation signals provided by oscillators 20 and 22. Smaller differences in these frequencies provide greater resolution in the measurement. The frequencies are substantially matched if they differ by less than 1 percent and, in some implementations, by no more than 1/10 percent. Such close matching of the frequencies is better achieved when oscillators 20 and 22 are located together on a common circuit substrate, as would be the case in a BIST implementation.

The matching of the frequencies of oscillators 20 and 22 on a common circuit substrate can be further enhanced by optional implementations that accommodate temperature sensitivity and power supply voltages applied to the oscillators. A common power supply for oscillators 20 and 22, as in a BIST implementation, prevents frequency variations between oscillators 20 and 22 that can arise from typical incidental variations in the operation of different power supplies. Similarly, a common circuit substrate for oscillators 20 and 22, as in a BIST implementation, provides a generally common thermal environment that can prevent frequency variations between oscillators 20 and 22 that can arise from typical localized temperature differences between discrete circuit components.

Even with a common circuit substrate, however, the thermal environment of oscillators 20 and 22 can vary depending on the manner in which they are operated. For example, oscillators 20 and 22 implemented with CMOS integrated circuitry draw current or not according to whether or not they are operating (i.e., on). If the separate triggering of oscillators 20 and 22 is implemented as oscillators being turned on from normally off states, a thermal difference can arise between oscillators 20 and 22 during the time one is on and the other is off. In particular, the current drawn through the oscillator that is on will heat that oscillator relative to the oscillator that is off, thereby introducing a thermal difference that can increase differences in the frequencies of oscillators 20 and 22.

In an implementation that avoids these thermal differences and the resulting frequency differences, oscillators 20 and 22 are operated continuously. Whenever a jitter measurement is to be performed, oscillators are temporarily turned off until they are re-started in response to their selected trigger events (e.g., leading or trailing edges of gate signal 14). The oscillators are turned off for 5 to 7 cycles (of the periodic signal being measured) prior to activating the clock gate. In this implementation, the temporary times that oscillators are turned off are insufficient for the underlying regions of the circuit substrate to cool enough to create thermal differences that cause appreciable frequency differences.

A common circuit substrate for oscillators 20 and 22 provides a thermal environment that allows them to be implemented as relatively simple, independent, free-running oscillators. Such an implementation is particularly suited for use in BIST applications. The match between the frequencies of oscillators 20 and 22 may be calibrated prior to a measurement. For example, the frequency match can be adjusted to be within the required tolerance, e.g. 0.1 percent, during a frequency calibration operation conducted immediately before the measurement.

In contrast to such simple implementations, U.S. Pat. No. 4,164,648 describes a time interval measurement system that uses triggered phase-locked oscillators. In addition to the added complexity of phase-locked oscillators, such a system terminates time measurement counts based upon coincidence between the phase-locked oscillators and a separate time base signal. The relative complexity of such a system makes it comparatively expensive to implement and ill-suited to use in BIST applications.

In general, schemes for measuring jitter rely on using time or frequency standards having better short term stability than that of the signal to be measured. The subject scheme does not. Instead its resolution is based upon the requirement that the relative difference between the two matched ring oscillator frequencies be smaller than the relative difference in period (i.e., jitter) to be measured. As a result, matched variations in the frequencies of the oscillators do not degrade the measurement resolution, even if the variations (e.g., jitter) in the oscillator signals are greater than the relative difference in period to be measured.

For example, with both oscillators coupled to a common power supply, as in a BIST application, variations in the power supply voltage can cause variations in the periods of the two oscillator signals (i.e., jitter). This jitter would be common to the two oscillators, and would not adversely affect the measurement accuracy. Similarly, jitter caused by temperature variations affecting the common substrate on which the oscillators are located would be common to the two oscillators and would not adversely affect the measurement accuracy. As a result, the jitter of the oscillators may be greater than the jitter to be measured.

In view of the many possible embodiments to which the principles of our invention may be applied, it should be recognized that the detailed embodiments are illustrative only and should not be taken as limiting the scope of our invention. For example, the systems and methods of the present invention are described as measuring jitter, but can be used generally to measure substantially any signal periods. Accordingly, the invention includes all such embodiments as may come within the scope and spirit of the following claims and equivalents thereto.

What is claimed is:

1. In an integrated circuit, a built-in, self-test vernier period measurement system for measuring a varying period in a periodic signal waveform that is generated by the integrated circuit and has first and second waveform features, comprising:

first and second matched solid-state oscillators that are included in the integrated circuit and generate respective first and second oscillation signals with substantially matched frequencies, the first and second oscillators being repeatedly triggered with respect to the respective first and second waveform features;

a coincidence detector that is included in the integrated circuit and detects when selected portions of the first and second oscillation signals are coincident with each other;

a counter that repeatedly provides a measurement count of the periods of at least one of the first and second oscillation signals from when it is triggered to when it is coincident with the other of the first and second oscillation signals, wherein plural successive measurement counts are obtained for the varying period and in which the system further comprises a measurement data analysis system for providing a jitter analysis of the varying period based upon the plural measurement counts.

2. The system of claim 1 in which the measurement data analysis system provides a histogram analysis based upon the plural measurement counts.

3. The system of claim 1 in which the counter provides a count of the first oscillation signal and the system further comprises a second counter that provides a count of the second oscillation signal.

4. The system of claim 1 further comprising a period gate generator that generates a gate signal with representations of the first and second waveform features and the instantaneous period of the signal waveform and in which the first and second oscillators are triggered from the representations of the first and second waveform features, respectively.

5. The system of claim 1 in which the signal waveform is periodic and the periodic signal waveform is provided by a phase-locked loop that is included on the integrated circuit.

6. The system of claim 1 in which the first and second oscillators are maintained in a normally on state and triggering them includes temporarily ending the oscillation signals and then resuming them again with respect to the respective first and second waveform features.

7. The system of claim 1 further comprising a single power supply for the first and second oscillators.

8. The system of claim 1 in which the first and second waveform features respective leading and trailing edges of the signal waveform.

9. The system of claim 1 in which the frequencies of the first and second oscillators are substantially matched to a difference of less than one percent.

10. The system of claim 9 in which the frequencies of the first and second oscillators are substantially matched to a difference of 0.1 percent or less.

11. The system of claim 1 in which the frequencies of the first and second oscillators are substantially matched to a difference of less than one percent.

12. The system of claim 11 in which the frequencies of the first and second oscillators are substantially matched to a difference of 0.1 percent or less.

13. A built-in, self-test vernier period measurement method for measuring a varying period in a periodic signal waveform that is generated by the integrated circuit and has first and second waveform features, comprising:

generating with first and second matched solid-state oscillators on the integrated circuit respective first and second oscillation signals with substantially matched frequencies, the first and second oscillation signals being triggered with respect to the first and second waveform features, respectively;

detecting when selected portions of the first and second oscillation signals are coincident with each other; and repeatedly counting the periods of at least one of the first and second oscillation signals from when it is triggered to when it is coincident with the other of the first and second oscillation signals.

14. The method of claim 13 further comprising determining from the count of the periods of the at least one of the first and second oscillation signals a measurement of a time interval between the first and second waveform features.

15. The method of claim 13 further comprising providing a jitter analysis based upon the repeated measurement counts.

16. The method of claim 15 in which the jitter analysis provides a histogram analysis based upon the plural measurement counts.

17. The method of claim 13 further comprising counting the periods of both of the first and second oscillation signals from when they are triggered to when they are coincident with each other.

18. The method of claim 13 further comprising generating a gate signal with representations of the first and second waveform features and the instantaneous period of the signal waveform and triggering first and second oscillation signals from the representations of the first and second waveform features, respectively.

19. The method of claim 13 in which the periodic signal waveform is provided by a phase-locked loop that is included in the integrated circuit.

20. The method of claim 13 in which generating the first and second oscillation signals includes temporarily terminating them and then generating them again with respect to the respective first and second waveform features.

21. The method of claim 13 in which the first and second waveform features are respective leading and trailing edges of the signal waveform.

22. In an integrated circuit that generates a periodic signal waveform having first and second waveform features, a built-in self test component for measuring jitter in periodic signal waveform, comprising:

first and second solid-state oscillators that are included in the integrated circuit and generate respective first and second oscillation signals with substantially matched frequencies, the first and second oscillators being repeatedly triggered with respect to the respective first and second waveform features;

a coincidence detector that repeatedly detects when selected portions of the first and second oscillation signals are coincident with each other; and a counter that repeatedly provides a measurement count of the periods of at least one of the first and second oscillation signals from when it is triggered to when it is coincident with the other of the first and second oscillation signals.

23. The circuit of claim 22 further comprising a measurement data processor that determines from the count of the periods of the at least one of the first and second oscillation signals a measurement of a time interval between the first and second waveform features.

24. The circuit of claim 22 in which plural measurement counts are obtained for the periodic signal waveform and in which the system further comprises a measurement data analysis system for providing a jitter analysis based upon the plural measurement counts.

25. The circuit of claim 24 in which the measurement data analysis system provides a histogram analysis based upon the plural measurement counts.

26. The circuit of claim 22 in which the counter provides a count of the first oscillation signal and the system further comprises a second counter that provides a count of the second oscillation signal.

27. The circuit of claim 22 further comprising a period gate generator that generates a gate signal with representations of the first and second waveform features and the instantaneous period of the periodic signal waveform and in which the first and second oscillators are triggered from the respective representations of the first and second waveform features, respective.

28. The circuit of claim 22 in which the first and second oscillators are maintained in a normally on state and triggering them includes temporarily ending the oscillation signals and then resuming them again with respect to the respective first and second waveform features.

29. The circuit of claim 22 further comprising a single power supply for the first and second oscillators.

30. The circuit of claim 22 in which the integrated circuit includes a phase-locked loop that generates the periodic signal waveform.

31. An integrated circuit vernier period measurement system for measuring a varying period in a periodic signal waveform having first and second waveform features, comprising:

first and second matched solid-state oscillators that are included in the integrated circuit and generate respective first and second oscillation signals with substantially matched frequencies, the first and second oscillators being repeatedly triggered with respect to the respective first and second waveform features;

a coincidence detector that is included in the integrated circuit and repeatedly detects when selected portions of the first and second oscillation signals are coincident with each other;

a counter that repeatedly provides a measurement count of the periods of at least one of the first and second oscillation signals from when it is triggered to when it is coincident with the other of the first and second oscillation signals, wherein plural successive measurement counts are obtained for the varying period and in which the system further comprises a measurement data analysis system for providing a jitter analysis of the varying period based upon the plural measurement counts.

32. A jitter measurement test component on an integrated circuit for testing jitter in a periodic signal waveform having first and second waveform features, comprising:

first and second solid-state oscillators that are included in the integrated circuit and generate respective first and second oscillation signals with substantially matched frequencies, the first and second oscillators being repeatedly triggered with respect to the respective first and second waveform features;

a coincidence detector that repeatedly detects when selected portions of the first and second oscillation signals are coincident with each other; and a counter that repeatedly provides a measurement count of the periods of at least one of the first and second oscillation signals from when it is triggered to when it is coincident with the other of the first and second oscillation signals.

* * * * *